May 29, 1951  E. BOBARD  2,554,556
AGRICULTURAL TRACTOR AND COUPLING DEVICE THEREFOR
Filed Feb. 28, 1945  9 Sheets-Sheet 1

Fig.1

Inventor
Emile Bobard
by his attorneys
Howson and Howson

May 29, 1951        E. BOBARD        2,554,556
AGRICULTURAL TRACTOR AND COUPLING DEVICE THEREFOR
Filed Feb. 28, 1945        9 Sheets-Sheet 2

Fig.2

Inventor
Emile Bobard
by his attorneys
Howson and Howson

May 29, 1951 E. BOBARD 2,554,556
AGRICULTURAL TRACTOR AND COUPLING DEVICE THEREFOR
Filed Feb. 28, 1945 9 Sheets-Sheet 3

Inventor
Emile Bobard
by his attorneys
Howson and Howson

May 29, 1951 E. BOBARD 2,554,556
AGRICULTURAL TRACTOR AND COUPLING DEVICE THEREFOR
Filed Feb. 28, 1945 9 Sheets-Sheet 7

Inventor
Emile Bobard
by his attorneys
Howson and Howson

May 29, 1951 E. BOBARD 2,554,556
AGRICULTURAL TRACTOR AND COUPLING DEVICE THEREFOR
Filed Feb. 28, 1945 9 Sheets-Sheet 8

Fig. 10

Inventor
Emile Bobard
by his attorneys
Howson and Howson

May 29, 1951          E. BOBARD          2,554,556
AGRICULTURAL TRACTOR AND COUPLING DEVICE THEREFOR
Filed Feb. 28, 1945          9 Sheets-Sheet 9

Patented May 29, 1951

2,554,556

UNITED STATES PATENT OFFICE 2,554,556

AGRICULTURAL TRACTOR AND COUPLING DEVICE THEREFOR

Emile Bobard, Beaune, France

Application February 28, 1945, Serial No. 580,218
In France February 21, 1942

Section 1, Public Law 690, August 8, 1946
Patent expires February 21, 1962

11 Claims. (Cl. 180—12)

The present invention has for its object improvements in those tractors provided with a front driving wheel which are particularly adapted for agricultural purposes.

It has already been proposed to provide agricultural tractors with three or four wheels, the frame of which is devised in a manner such that the wheels may advance on either side of rows of plants, said rows lying between the paths followed by the wheels, but the tractor executed in accordane with the present invention has a much wider interest.

Its object is chiefly to obtain for agricultural purposes, through mechanical means, the same advantages as those obtained through animal traction, said result being achieved with a single vehicle.

The usual traction operations required in agriculture are of different kinds, to wit:

a. Drawing or pushing of various farming implements resting entirely on the ground by reason of their own weight and having no wheels, such as ploughs, harrows and the like.

b. Traction over any ground, and particularly over loose ground, of two-wheeled half-tow-carriages or other two-wheeled machines such as manure distributors, sowing machines, mowing-machines, rooting-up machines and the like.

c. Transportation of more or less wide and long skips or boxes loaded with earth, manure, dung, or of agricultural machines without wheels such as manure distributors, sowing machines and the like which are in this case merely carried from one place to another.

d. Traction through one or two animals yoked as desired, for instance in tandem, in accordance with the kind of work required.

e. Speedy and frequent change of the kind of work undertaken.

These and other features of the invention will appear from the following description and from the appended drawings illustrating by way of example several forms of execution of the invention.

Figure 1:
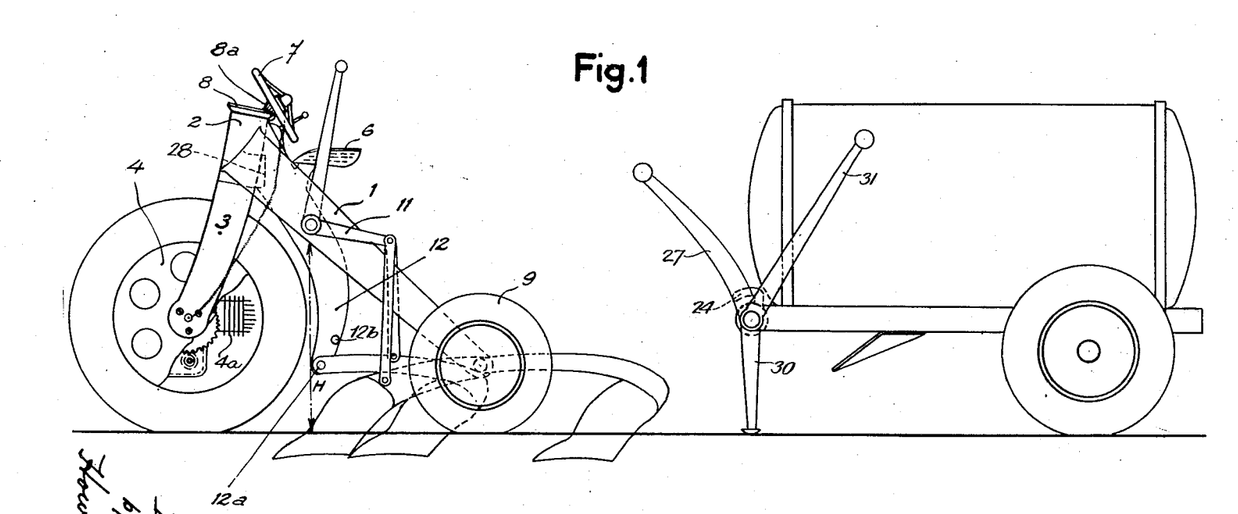
Fig. 1 is a side-view of one form of the tractor and of its tow-carriage shown separated.

The tractor shown in Fig. 1 comprises chiefly a V-shaped frame constituted by two arms 1 and 1' joined at their fore end to a tube 2 forming the steering-bar of a fork 3 carrying the driving wheel 4. This wheel is preferably of the known type wherein the driving motor 4a is carried inside the wheel itself.

The two arms 1 and 1' are preferably connected through a reinforcing cross-bar 5 and the tube 2 carries a device for controlling the inner steering-tube, which device comprises a steering-wheel 7 the shaft of which operates a gear wheel 8 through the agency of a pinion 8a.

Figure 2:
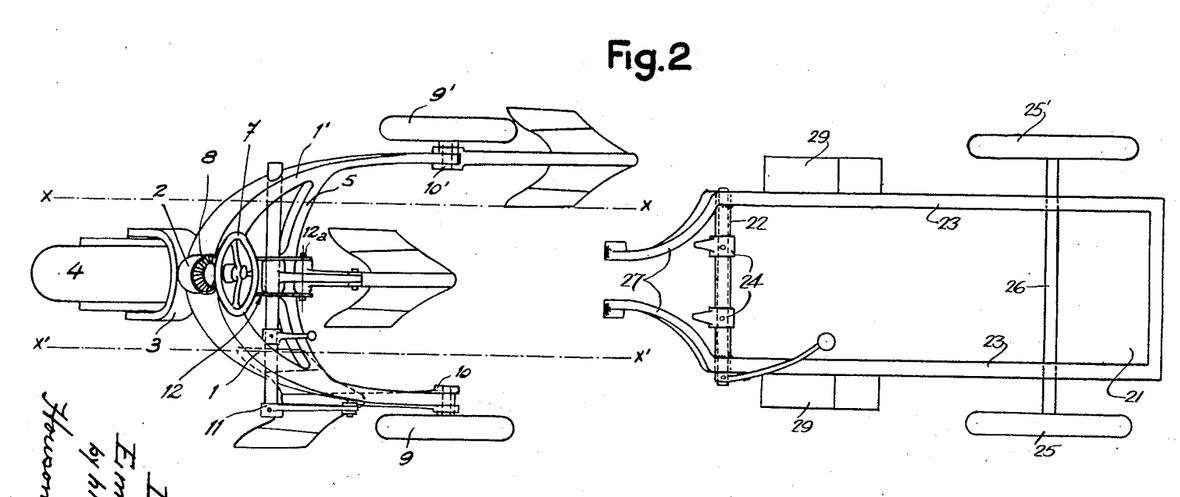
Fig. 2 is a corresponding plan view.

The branches 1 and 1' slope downwardly from front to rear and are provided at their rear ends with carrier wheels 9 and 9'. Due to the spacing between the arms 1 and 1' and to their downward sloping as described there exist between the tracks followed by the three wheels two lines such as XX and X'X' over which the arms 1 and 1' respectively ride at a given height H above ground. Consequently the tractor is adapted to ride, in the usual manner, over rows of plants alined along XX and X'X' so as to operate in three furrows with three tools or implements following the tracks of the corresponding wheels 4, 9 and 9'.

The fastening of the tools or implements in the tracks of the wheels 9 and 9' may be performed very easily by means of two straps 10 and 10' directed towards the front or towards the rear of the wheels. The ploughs or the like may be raised by a lever system 11 of any suitable type.

The fastening to the rear of the front steering wheel 4 is performed by means of an arrangement disclosed hereinafter which allows the fastening as desired either of a simple farming implement or of a tow-carriage. This arrangement comprises chiefly a draught arm 12, preferably arcuate, surrounding partly the front wheel and rigid with the frame to the central part of which it is secured, said arm 12 carrying if required a seat 6. At its lower end, this arm 12 is hollowed out so as to afford a passage for the stubshaft 12a which provides means for the desired fastening of a farming implement.

The particular arrangement intended for attaching a tow-carriage will be disclosed hereinafter.

Figure 3:
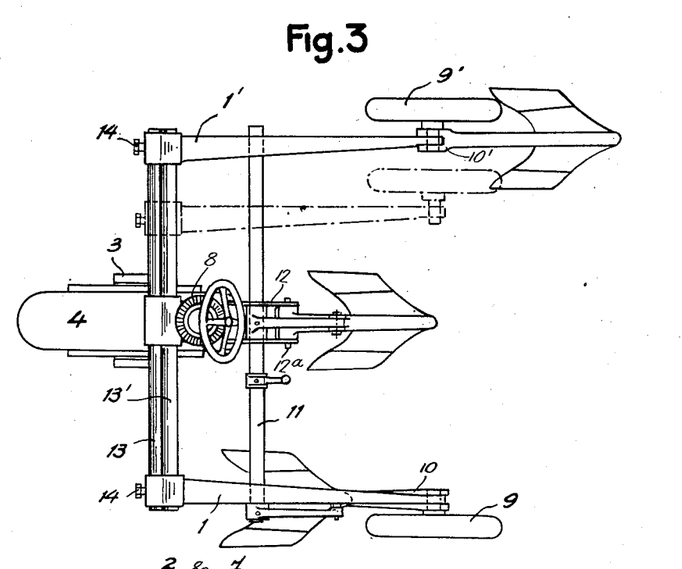
Figs. 3 and 4 are plan and side views of another type of tractor.
Figure 4:
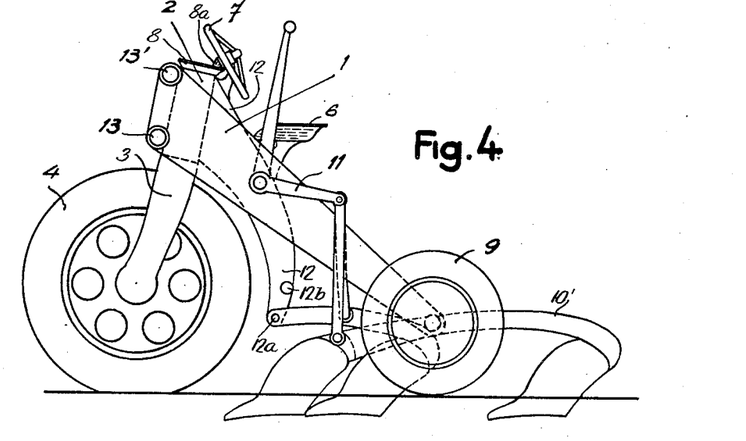

The frame may be given various shapes. In the example of Figs. 3 and 4, the two arms 1 and 1' are arranged perpendicularly to a cross-beam constituted by two parallel tubes 13 and 13' to which is secured the steering tube 2. This arrangement shows the advantage of allowing an adjustment of the free space between the wheels i. e. of the spacing between the two arms 1 and 1'. To this end, it is sufficient to provide the front end of each arm with two sleeves adapted to slide over the tubes 13 and 13', the bolting in the chosen position of adjustment being ensured for instance by means of screws 14 tightened over the tubes and engaging preferably holes provided therefor in the tubes.

Figure 5:
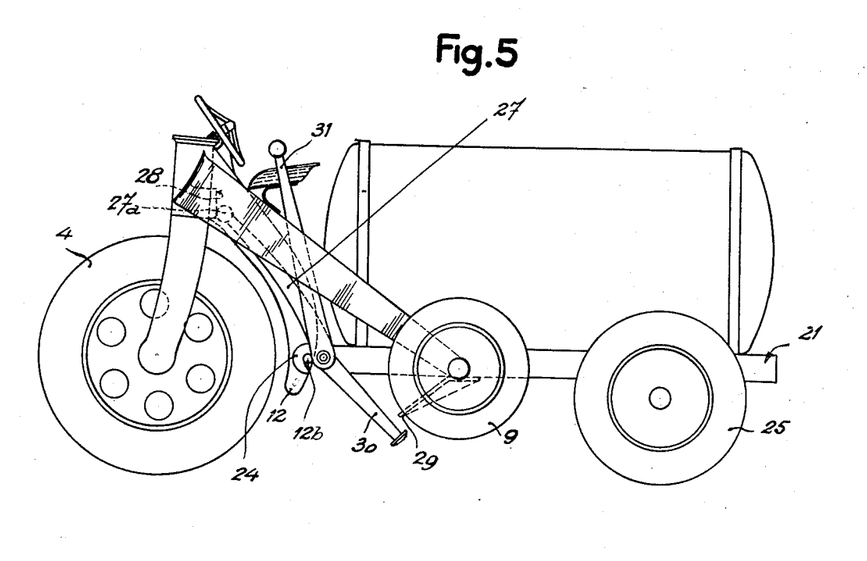
Figs. 5 and 6 show the tractor of Figs. 1 and 2 with its tow-carriage fastened to it.
Figure 6:
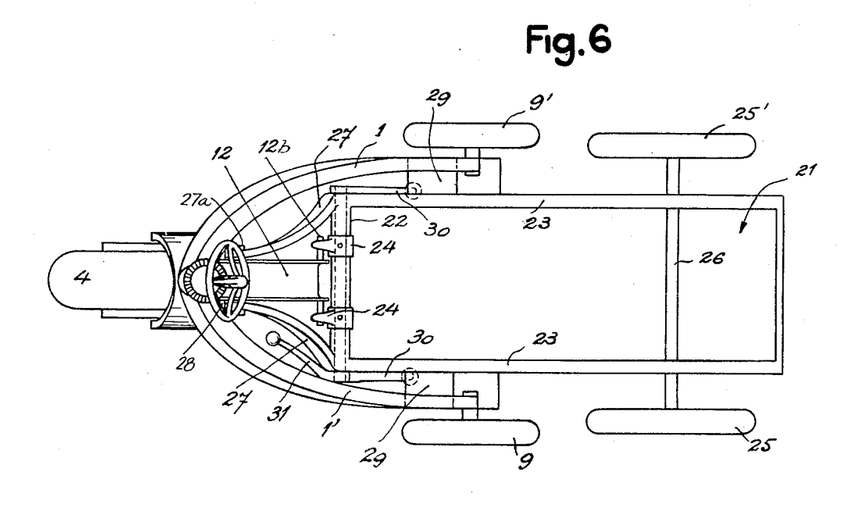

Figs. 5 and 6 show with further detail the manner of attaching a tow-carriage 21. This comprises a frame having at the front end a cross-beam 22 connecting the longitudinal beams 23 of the tow-carriage frame and carrying two hooks 24 engaging the free ends of the stub-shaft 12b mounted similarly to the stub-shaft 12a.

For satisfactory conditions of draught and in particular for a good adhesion of the front driving wheel it is necessary for the weight of the tow-carriage to bear on said front wheel. To this end, the tow-carriage comprises only two wheels 25 and 25' carried by an axle 26 located at the rear of the tow-carriage the weight of which will therefore urge it to rock forwardly. The longitudinal beams 23 have therefor extensions 27 the front ends of which converge toward one another so as to snugly fit against the draught arm 12 and to rest on supports 28 arranged on either side of the steering tube. Thus said steering tube transmits to the front wheel the weight of the tow-carriage which it receives through the arms 27. In order to provide for this transmission of weight under the best possible conditions, it is moreover necessary for the wheels 9 and 9' to be prevented from contacting with the ground as soon as the tow-carriage is fastened to the tractor; otherwise stated, the tractor and carriage sysem after fastening should rest on the ground only through the front wheel 4 of the tractor and the wheels 25—25' of the tow-carriage as clearly shown in Fig. 5. This raising of the wheels is performed automatically through a rearward motion of the tractor, due to the action of the stops 27a at the front end of the arms 27 engaging the supports 28 and pivoting the fork 3 and arms 1, 1' about the axis of the wheel 4. This raising of the wheels may also be obtained by means of sloping planes 29 located to either side of the longitudinal beams 23 of the tow-carriage and adapted to engage the rear ends of the corresponding arms 1—1' as soon as the tractor is moved backwards for fastening the tow-carriage. The latter carries moreover two props 30 adapted to pivot round the tubular cross-beam 22 under the action of any suitable control means such as a lever 31. This lever 31 provides also for the rocking of the hooks 24.

Figure 7:
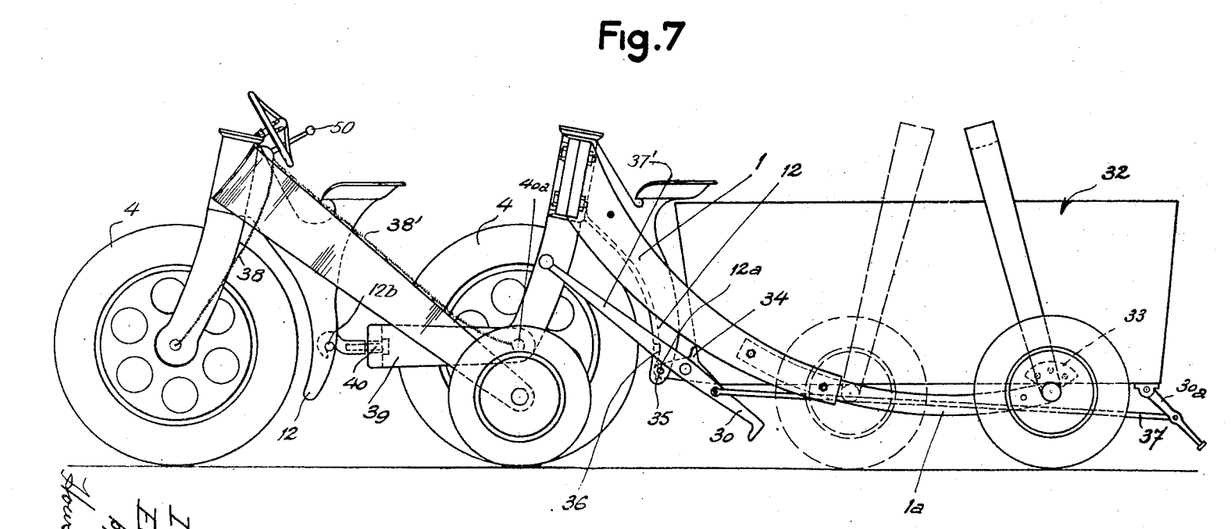
Fig. 7 shows the tractor of Figs. 3 and 4, having a frame of adjustable length, as fastened to a tow-carriage with no wheels, and also a system of two tractors fastened one to another.
Figure 8:
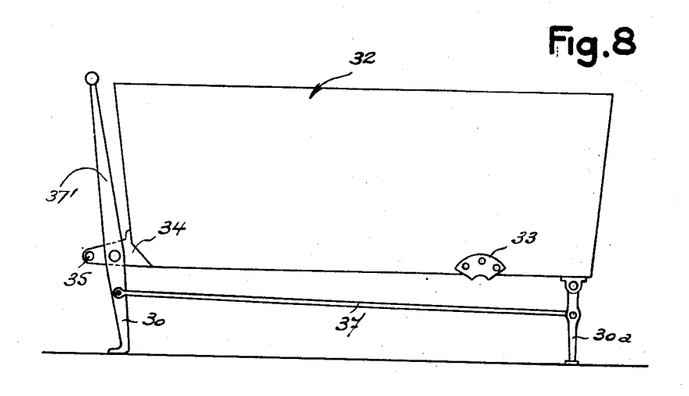
Fig. 8 is a view of the box-shaped tow-carriage without wheels, seen alone.

Figs. 7 and 8 illustrate an arrangement wherein the tow-carriage has no wheels and is reduced to a mere box adapted to be rigidly secured between the arms 1—1' of the tractor, the front end of the box remaining as above fastened to the draught arm 12. Each side of this box 32 is provided to this end, with a small side-plate 33 showing a semi-circular recess adapted to rest on a projecting end of the wheel shaft provided at the end of the arm 1 or 1'. The front of the box 32 carries a plate 34 provided with a perforation 35 through which the stubshaft 12b is adapted to pass. This stubshaft used for fastening ordinary farming implements should be removed previous to the engagement of the plate 34 inside the fork provided at the lower end of the arm 12. This arm may advantageously assume in cross-section the shape of a U, with a boss 36 provided at the bottom of said U for positively guiding the plate 34 into its recess in front of the stubshaft 12b; obviously two sets of props 30 and 30a should be provided respectively at the front and rear of the box 32, both sets of props being controlled simultaneously by a common control lever 37' through the agency of a connecting rod 37 pivotally secured to said sets.

In the case described, it is of advantage to make use of a tractor frame comprising longitudinal beams 1 and 1' the length of which is adjustable so as to keep the rear wheels always at the rear of the tractor and box system, whatever the length of said box 32 may be. These longitudinal beams are, to this purpose, constituted by two elements 1 and 1a adapted either to slide one with reference to the other and to be locked by bolts in the adjusted position chosen or else to be secured merely after removing and remounting the wheels.

All the above described tractors are particularly well adapted for coupling two such tractors together, forming thus a compound unit of reduced bulk which doubles for a single driver the power available for traction or agricultural work.

To this end in the most general manner, the control means for the fuel admixture and for the coupling of the different motors are all centralized at a single control point. But, for sake of greater simplicity, there is only shown, in Figs. 7, 9 and 10 the control means 50 for the fuel admixtures which act on the motors through the cables 38—38'; the motor couplings are supposed to be of the automatic type and begin or cease being operative for a constant predetermined speed of the motors.

Figure 9:
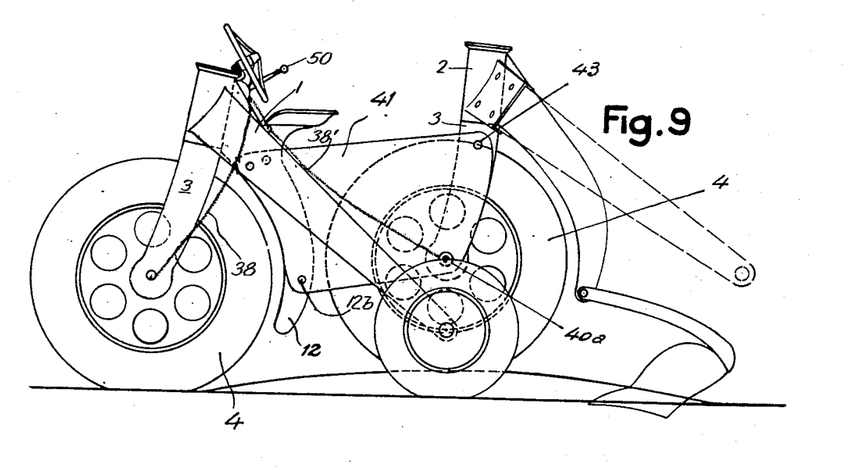
Figs. 9 to 11 illustrate another system for fastening two tractors together.
Figure 10:
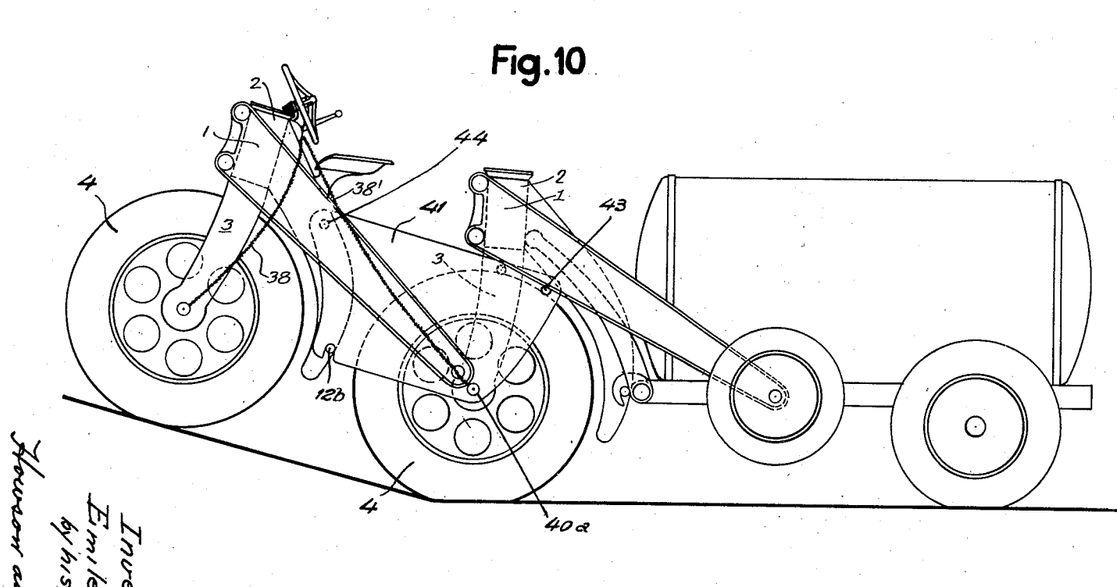
Figure 11:
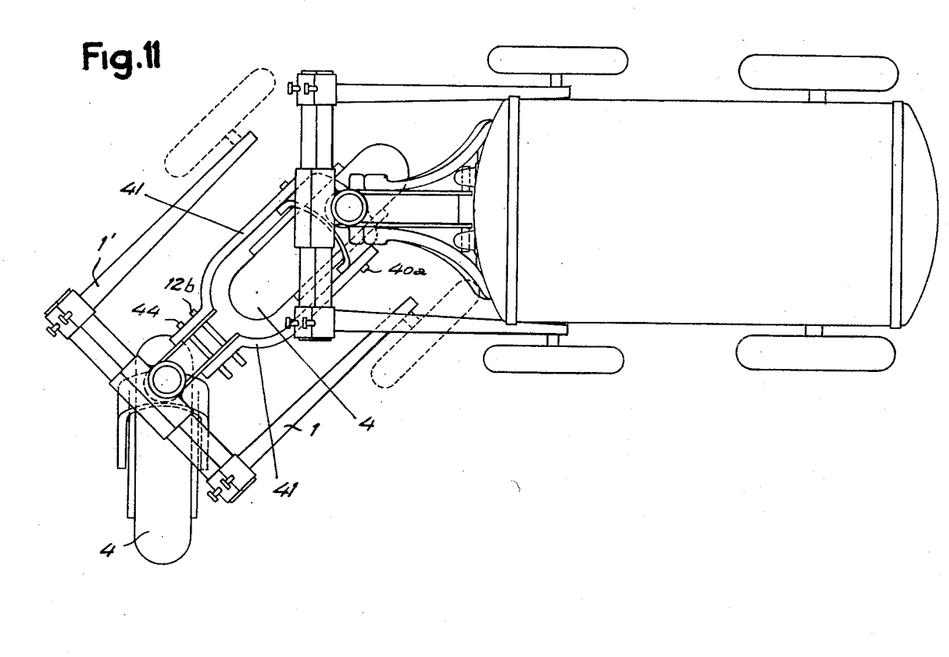

Several types of mechanical connections between the tractor frames may be used wherein:

a. The six wheels all rest on the ground (Fig. 7).

b. The two side wheels of the rear tractor are both raised or removed, which arrangement increases the efficiency of the whole and allows a reduction of its bulk (Figs. 9 and 10).

c. The two lateral wheels of the front tractor are raised or removed in which case the two tractors may either be coupled alone with one another or else be coupled also with a tow-carriage having two rear wheels (Figs. 10 and 11).

However in all these three cases, the fork of the rear tractor is always held in line with the frame of the front tractor by means of transversally rigid connecting means.

In the form of execution of Fig. 7, the draught arm 12 of the front tractor is rigidly connected in the transverse direction with the fork of the rear tractor through a coupling part 39, also fork-shaped, which is designed as follows: its length is such that the central front wheel of the rear tractor rests constantly on the ground in alinement with the rear wheels of the front tractor, so as to provide for the correct simultaneous motion of said three wheels in curves; it comprises a longitudinally disposed pivotal link 40 which allows the rear wheels of the two tractors to follow, independently for the two tractors, without difficulty the unevennesses of the ground; part 39 comprises also two horizontal links 12b and 40a which allow the front wheel of the rear tractor to move substantially in the same vertical plane as that in which the two rear wheels of the front tractor move, whereby it follows without any difficulty the undulations of the ground which may affect the relative positioning of said three wheels. These two links 12b and 40a may be provided with notches so as to make the coupling operation easier.

In the form of execution of Fig. 9 the side wheels of the rear tractor are removed. Therefore the unevennesses of the ground between the two sets of side wheels need no longer to be considered. On the other hand the rear tractor shows no stability per se but receives its stability from the front tractor through a coupling 41. The coupling comprises two symmetrical plates which may be integral with one another or independent. The length of this coupling part 41 between the axes of the supporting holes or notches for the stub shafts 12b and 40a is such that the central wheel of the rear tractor rests constantly on the ground in alinement with the two side wheels of the front tractor. Coupling 41 also shows a transversal rigidity which is such that, when fitted over both the draught arm of the front tractor and the fork of the rear tractor, it transmits the lateral stability of the front tractor to the rear tractor.

A third securing point 43 with the upper part of the fork of the rear tractor gives the latter the desired stability in the front-to-rear direction, the pivot or stubshaft 12b ensuring constantly the correct bearing of the second driving wheel, whatever the undulations of the ground may be between said second driving wheel and the two side wheels between which it advances.

Another form of the invention illustrated in Figs. 10 and 11 also employs the symmetrical plates. In Figures 10 and 11, however, the front tractor has lost its normal stability and must receive it from the rear tractor, whether the latter is coupled with tow-carriage or not.

The sole modification in Figures 10 and 11 with reference to Figure 9 lies in the fact that the third point (43 in Fig. 9) through which the two tractors were interconnected is now transferred to point 44 at the upper end of the draught arm of the front tractor, so that a pivoting connection between the two tractors which was provided at 12b in Figure 9 is now provided at 40a in Fig. 10, said link 40a being necessary and sufficient for compensating any unevennesses of the ground.

Referring to the form of Fig. 9 and the form of Figs. 10 and 11, the coupling 41 is shown as designed for use with either of these forms. The connection point 44 is shown but not used in Fig. 9; and the connection point 43 is shown but not used in Figs. 10 and 11. The side wheels which are rendered useless by such couplings may be either removed or left in place, as well as the arms supporting same. This produces a substantial reduction in the weight and bulk of the novel tractor systems thus designed.

What I claim is:

1. A tractor chiefly for agricultural purposes comprising in combination a front driving and steering wheel, a substantially vertical fork in which said wheel is mounted, said fork having a pivot part, a frame comprising a tubular part for engagement with the pivot of the fork, and parts extending from the tubular part transverse to the forward direction of the vehicle and also descending rearwardly, two stabilizing rear wheels supported by said rearwardly descending parts, and draught means extending downwardly from said tubular part and around a portion of the driving wheel adjacent its rear periphery, said means including towing parts for engagement with a towed device.

2. A tractor chiefly for agricultural purposes comprising in combination a front driving and steering wheel, a substantially vertical fork in which said wheel is mounted, said fork having a pivot part, a frame comprising a tubular part for engagement with the pivot of the fork, a part transverse to the forward direction of the vehicle and carried above the wheel, two arms descending rearwardly from the ends of said transverse part, two stabilizing rear wheels supported by said two arms, and means extending downwardly from said tubular part and around a portion of the driving wheel adjacent its rear periphery, said means including towing parts for engagement with a towed device.

3. A tractor chiefly for agricultural purposes comprising two lateral rear wheels, a central steering and driving front wheel, a fork carrying the front wheel, a frame member mounted on said fork, a cross-arm secured to said frame member, two longitudinal arms adapted to adjustably slide over said cross-arm, a draught arm extending along and to the rear of the front wheel and rigidly secured to the frame member, and means at the lower rear end of said draught arm arranged in front of the rear wheels and adapted for coupling at will with another device.

4. In a tractor as claimed in claim 1 adapted to draw a two-wheeled vehicle, the provision of cooperating means on the draught means and on the vehicle adapted to provide a transversally rigid connection of the tractor with said vehicle.

5. In a tractor as claimed in claim 1 adapted to draw a two-wheeled vehicle, the provision of stops on the frame member adapted, when engaging the vehicle, during the rearward motion of the tractor towards said vehicle before coupling, to ensure the automatic raising of the two rear wheels of the tractor above ground.

6. In a tractor as claimed in claim 1, adapted to draw a two-wheeled vehicle, the provision of supports formed on the frame member of the tractor, an arm rigid with the frame of said vehicle adapted to rest on said supports whereby the coupling of the tractor and vehicle raises automatically the rear wheels of the tractor above ground.

7. In a tractor as claimed in claim 1 adapted to draw a two-wheeled vehicle, the provision of sloping planes formed at the lower part of the vehicle and adapted to engage the ends of said rearwardly descending parts and thereby to raise the rear wheels of the tractor above ground when coupling.

8. The combination of a tractor as claimed in claim 1 with a second tractor and a coupling device for connecting said tractors, said second tractor being rearwardly of the first tractor and including a wheel, a fork in which said wheel is mounted, and a frame in which said fork is pivoted, said coupling device comprising means insuring the transversely rigid coupling of the two tractors and including a stub shaft carried transversely by the draught means of the front tractor, said stub shaft forming the sole connection of said coupling device with the front tractor whereby to allow a vertical pivoting motion of the rear tractor relative to the front tractor.

9. The combination of a tractor as claimed in claim 1 with a second tractor and a coupling device for connecting said tractors, said second tractor being rearwardly of the first-named tractor and including a wheel, a fork in which said wheel is mounted, and a frame in which said fork is pivoted, said coupling device comprising means insuring the transversely rigid coupling of the two tractors, and including a stub shaft carried at the lower end of the front part of the frame of the rear tractor, said stub shaft forming the sole connection of said coupling device with the rear tractor whereby to allow a vertical pivoting motion of the front tractor relative to the rear tractor.

10. The combination of a tractor as claimed in claim 1 with a second tractor and a coupling device for connecting said tractors, said second tractor being rearwardly of the first-named tractor and including a wheel, a fork in which said wheel is mounted and a frame in which said fork is pivoted, said coupling device comprising a plate arrangement the front of which is secured to the draught means of the front tractor, and the rear of which is secured to the front part of the frame of the rear tractor, said plate arrangement being adapted to be selectively secured by a pivotal connection either to the front tractor or to said front frame part of the rear tractor whereby a vertical pivotal motion may be had at will either with said draught means or with said front part.

11. A unit constituted by two coupled tractors each comprising two removable lateral wheels, a central driving and steering wheel, a motor, a rearwardly open frame carrying said three wheels, a draught arm extending along and to the rear of the front wheel and rigidly secured to the frame, common control means on one tractor for the motors of both tractors and means for coupling the draught arm of the front tractor with the front of the frame of the rear tractor adapted to rock longitudinally with respect to one another the frames of the two tractors and thus modify their inclination with reference to the ground.

EMILE BOBARD.

REFERENCES CITED

The following references are of record in the file of this patent:

UNITED STATES PATENTS

| Number | Name | Date |
|---|---|---|
| 1,105,551 | Dort | July 28, 1914 |
| 1,105,731 | Wells | Aug. 4, 1914 |
| 1,210,055 | Fairman | Dec. 26, 1916 |
| 1,306,483 | Hino | June 10, 1919 |

FOREIGN PATENTS

| Number | Country | Date |
|---|---|---|
| 19,738 | Great Britain | A. D. 1914 |
| 24,170 | Great Britain | Oct. 26, 1914 |
| 641,079 | France | July 27, 1928 |
| 195,206 | Switzerland | June 16, 1938 |